(12) United States Patent
Hsu et al.

(10) Patent No.: US 8,786,504 B2
(45) Date of Patent: Jul. 22, 2014

(54) CIRCUIT CAPABLE OF AUTOMATICALLY CALIBRATING A RESONANCE FREQUENCY OF AN ANTENNA AND METHOD THEREOF

(75) Inventors: Hsin-Chin Hsu, New Taipei (TW); Fang-Lih Lin, Taipei (TW); Chih-Hung Cheng, Taipei (TW)

(73) Assignee: AMICCOM Electronics Corporation, Hsinchu Science Park, Hsin-Chu (TW)

( * ) Notice: Subject to any disclaimer, the term of this patent is extended or adjusted under 35 U.S.C. 154(b) by 620 days.

(21) Appl. No.: 13/110,896

(22) Filed: May 18, 2011

(65) Prior Publication Data

US 2012/0242551 A1    Sep. 27, 2012

(30) Foreign Application Priority Data

Mar. 23, 2011    (TW) .............................. 100109855 A

(51) Int. Cl.
*H01Q 9/00*       (2006.01)
*H04B 5/00*       (2006.01)
*H04B 17/00*      (2006.01)

(52) U.S. Cl.
CPC ............ *H04B 5/0068* (2013.01); *H04B 5/0081* (2013.01); *H04B 17/0062* (2013.01)
USPC ............................. 343/745; 343/746; 343/747

(58) Field of Classification Search
USPC .................................................. 343/745–748
See application file for complete search history.

(56) References Cited

U.S. PATENT DOCUMENTS

| 2002/0163406 | A1* | 11/2002 | Kawai ........................... 333/214 |
| 2004/0137865 | A1  | 7/2004  | Callias |
| 2006/0220863 | A1  | 10/2006 | Koyama |
| 2010/0178888 | A1  | 7/2010  | Nomura et al. |
| 2012/0129477 | A1  | 5/2012  | Someya |

FOREIGN PATENT DOCUMENTS

| CN | 101615918 A | 12/2009 |
| CN | 1834998 B   | 6/2010  |
| CN | 101931397 A | 12/2010 |
| TW | M350105     | 2/2009  |

* cited by examiner

*Primary Examiner* — Matthew Mikels
(74) *Attorney, Agent, or Firm* — Winston Hsu; Scott Margo

(57) ABSTRACT

A circuit capable of automatically calibrating a resonant frequency of an antenna includes the antenna, a switch, a conversion unit, a count comparator, and a capacitor array. The switch is coupled to the antenna for being turned on and turned off according to a pulse. The antenna is used for generating the resonant frequency according to on and off of the switch. The conversion unit is coupled to the antenna for generating a clock according to a signal with the resonant frequency. The count comparator is coupled to the conversion unit for counting a number generated by a reference clock during a period of the clock, and comparing the pulse number with a predetermined value to generate an adjustment signal. The capacitor array is used for adjusting capacitance of the capacitor array according to the adjustment signal.

7 Claims, 3 Drawing Sheets

CIRCUIT CAPABLE OF AUTOMATICALLY CALIBRATING A RESONANCE FREQUENCY OF AN ANTENNA AND METHOD THEREOF

BACKGROUND OF THE INVENTION

1. Field of the Invention

The present invention is related to a circuit capable of automatically calibrating a resonant frequency of an antenna and method thereof, and particularly to a circuit and method thereof that can utilize a capacitor array with an adjustable value to calibrate a resonant frequency of an antenna automatically.

2. Description of the Prior Art

In a radio frequency identification (RFID) system, a reader transmits a modulation signal by an antenna thereof, then a signal receiver utilizes an antenna with a resonant frequency the same as a resonant frequency of the antenna of the reader to receive the modulation signal, and demodulates the modulation signal. However, because an inductor and a capacitor of the signal receiver have errors, an error usually exists between the resonant frequency of the signal receiver and the resonant frequency of the reader, resulting in the radio frequency identification system having a shorter operation distance. Therefore, integrated circuit process variation increases difficulty for a designer of the signal receiver to design a signal receiver that operates well.

SUMMARY OF THE INVENTION

An embodiment provides a circuit capable of automatically calibrating a resonant frequency of an antenna. The circuit includes an antenna, a switch, a conversion unit, a count comparator, and a capacitor array. The antenna has a first terminal, and a second terminal for receiving an electric wave transmitted by a reader. The switch has a first terminal coupled to the second terminal of the antenna, a second terminal coupled to ground, and a third terminal for receiving a pulse. The conversion unit has a first terminal coupled to the second terminal of the antenna for receiving a signal with the resonant frequency of the antenna, and a second terminal for outputting a clock, where the conversion unit is used for generating the clock according to the signal. The count comparator has a first terminal coupled to the conversion unit, and a second terminal for outputting an adjustment signal, where the count comparator is used for counting a number generated by a reference clock during a period of the clock, and comparing the number with a predetermined value to generate the adjustment signal. The capacitor array is used for adjusting a value of the capacitor array according to the adjustment signal.

Another embodiment provides a method capable of automatically calibrating a resonant frequency of an antenna. The method includes a switch being turned on and turned off according to a pulse; an antenna generating a resonant frequency according to turning-on and turning-off of the switch; a conversion unit generating a clock according to a signal with the resonant frequency; a count comparator counting a number generated by a reference clock during a period of the clock, and comparing the number with a predetermined value to generate the adjustment signal; a capacitor array adjusting a value of the capacitor array according to the adjustment signal.

The present invention provides a circuit capable of automatically calibrating a resonant frequency of an antenna and method thereof. The circuit and the method utilize a capacitor array with an adjustable value to shunt an antenna capacitor for generating an equivalent capacitor. Thus, the present invention can change the resonant frequency of the antenna by adjusting the value of the capacitor array to compensate for process variation of an inductor and the antenna capacitor.

These and other objectives of the present invention will no doubt become obvious to those of ordinary skill in the art after reading the following detailed description of the preferred embodiment that is illustrated in the various figures and drawings.

DETAILED DESCRIPTION

Figure 1A:
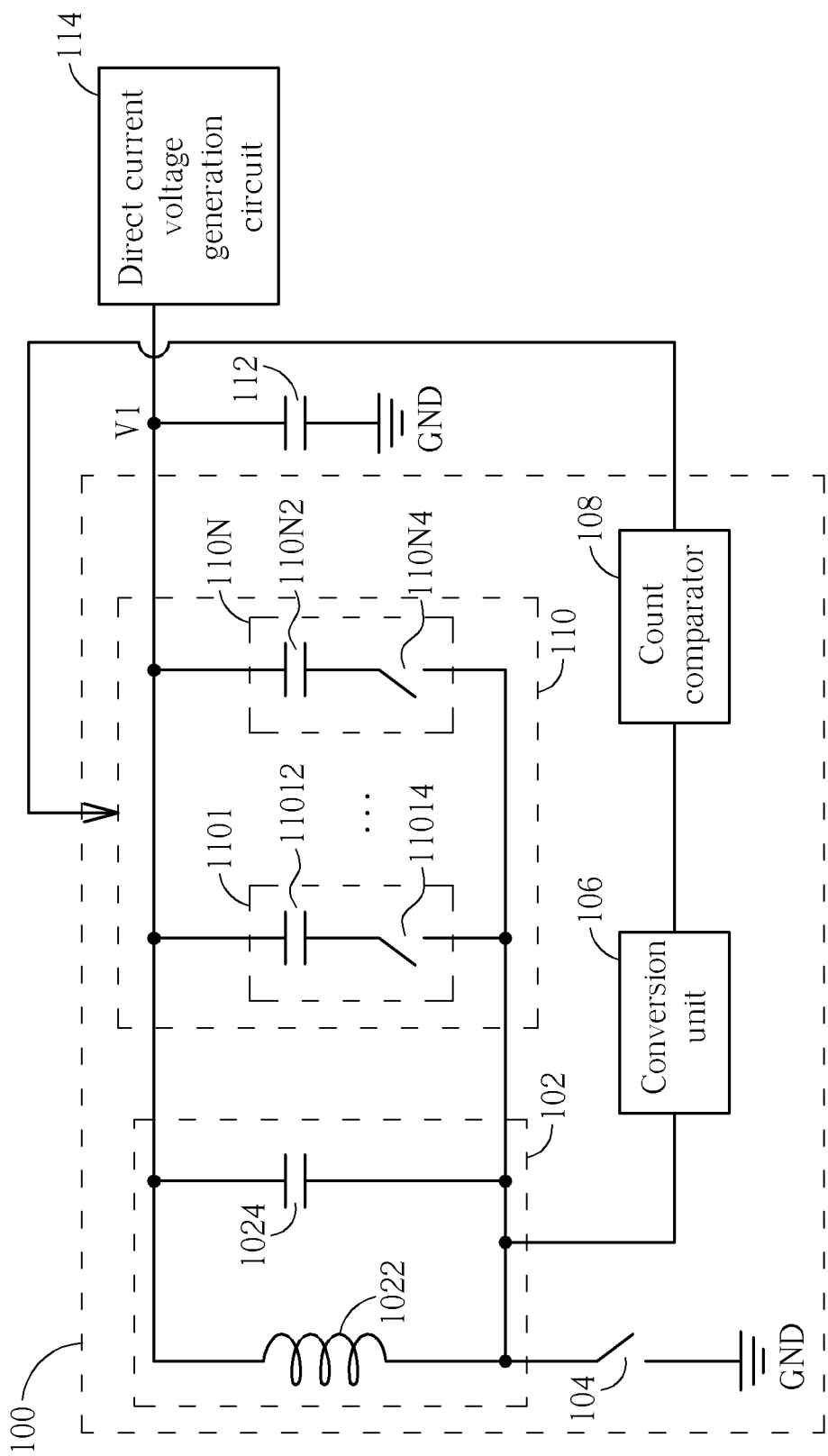
FIG. 1A is a diagram illustrating a circuit capable of automatically calibrating a resonant frequency of an antenna according to an embodiment.

Please refer to FIG. 1A. FIG. 1A is a diagram illustrating a circuit 100 capable of automatically calibrating a resonant frequency of an antenna according to an embodiment. As shown in FIG. 1A, the circuit 100 includes an antenna 102, a switch 104, a conversion unit 106, a count comparator 108, and a capacitor array 110. The antenna 102 has a first terminal, and a second terminal for receiving an electric wave transmitted by a reader. The switch 104 has a first terminal coupled to the second terminal of the antenna 102, a second terminal coupled to ground GND, and a third terminal. The conversion unit 106 has a first terminal coupled to the second terminal of the antenna 102, and a second terminal. The count comparator 108 has a first terminal coupled to the second terminal of the conversion unit 106, and a second terminal. The capacitor array 110 has a first terminal coupled to the first terminal of the antenna 102, a second terminal coupled to the second terminal of the antenna 102, and a third terminal coupled to the second terminal of the count comparator 108.

As shown in FIG. 1A, the antenna 102 includes an inductor 1022 and an antenna capacitor 1024. The inductor 1022 has a first terminal coupled to the first terminal of the antenna 102, and a second terminal coupled to the second terminal of the antenna 102. The antenna capacitor 1024 has a first terminal coupled to the first terminal of the antenna 102, and a second terminal coupled to the second terminal of the antenna 102. The capacitor array 110 is used for shunting the antenna capacitor 1024 to adjust the resonant frequency of the antenna 102. The capacitor array 110 includes a plurality of capacitor units 1101-110N, where N is a positive integer greater than 1. The capacitor unit $110i$ includes a capacitor $110i2$ and a switch $110i4$, where $1 \leq i \leq N$ and i is a positive integer. The capacitor $110i2$ has a first terminal coupled to the first terminal of the antenna 102, and a second terminal. The switch $110i4$ has a first terminal coupled to the second terminal of the capacitor $110i2$, a second terminal coupled to the second terminal of the antenna 102, and a third terminal coupled to the third terminal of the capacitor array 110. For example, a capacitor unit 1101 includes a capacitor 11012 and a switch 11014. The capacitor 11012 has a first terminal coupled to the first terminal of the antenna 102, and a second terminal. The switch 11014 has a first terminal coupled to the second terminal of the capacitor 11012, a second terminal coupled to the second terminal of the antenna 102, and a third terminal coupled to the third terminal of the capacitor array 110. In addition, values of the plurality of capacitors of the capacitor array 110 are the same or different.

Figure 1B:
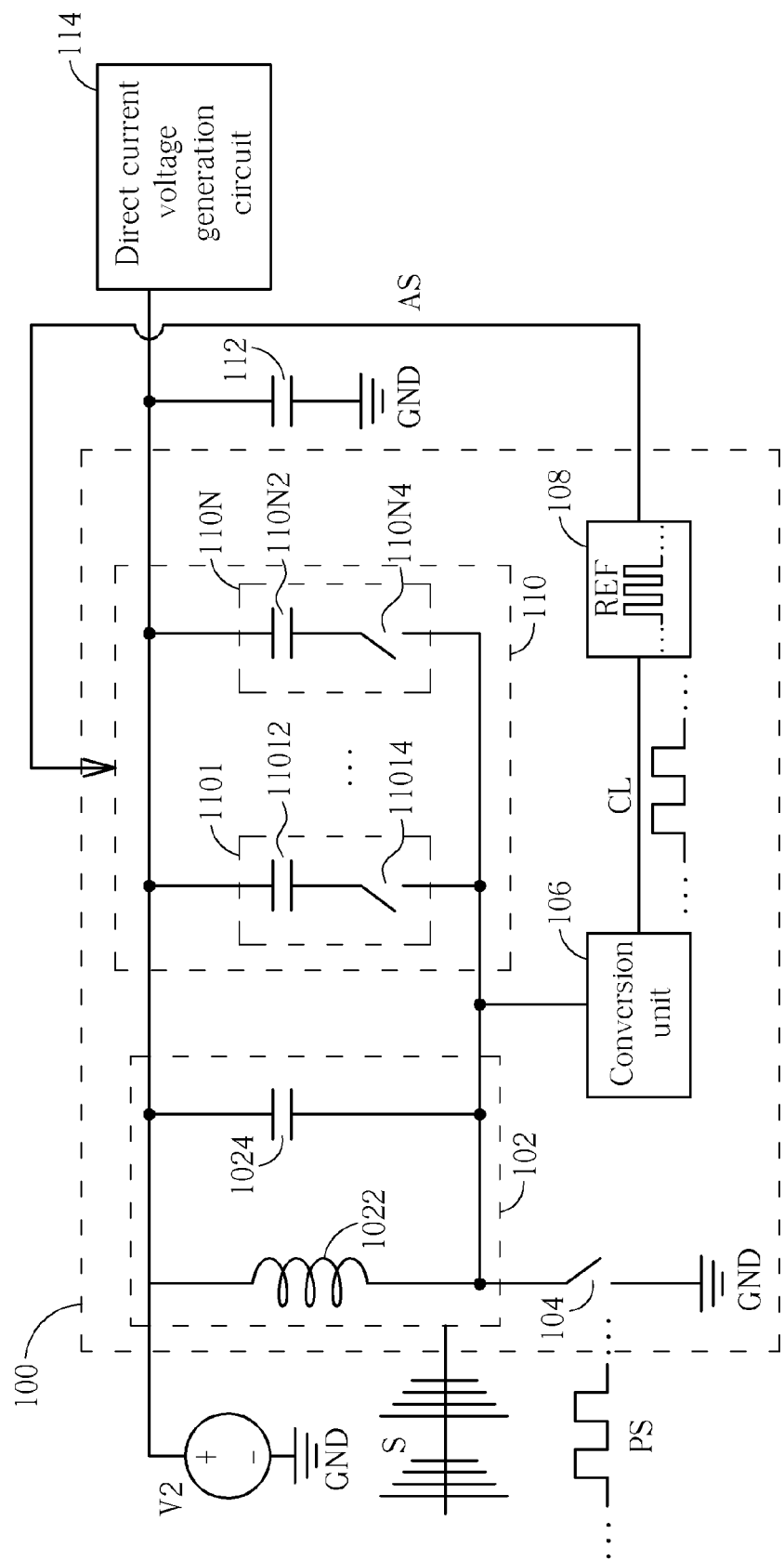
FIG. 1B is a diagram illustrating calibrating the resonant frequency of the antenna of the circuit.

Please refer to FIG. 1B. FIG. 1B is a diagram illustrating calibrating the resonant frequency of the antenna 102 of the circuit 100. The third terminal of the switch 104 receives a pulse PS, and the switch 104 is turned on and turned off according to the pulse PS. The first terminal of the antenna 102 is coupled to a direct current voltage V2, and the antenna 102 generates a signal S with the resonant frequency ω according to turning-on and turning-off of the switch 104. The conversion unit 106 generates a clock CL according to the signal S with the resonant frequency ω, where the clock CL is a digital square wave. The count comparator 108 counts a number CN generated by a reference clock REF during a period T of the clock CL, and compares the number CN with a predetermined value PV to generate an adjustment signal AS. The third terminal of the capacitor array 110 receives the adjustment signal AS. Therefore, the capacitor array 110 can turn on and turn off the plurality of switches 11014-110N4 included by the capacitor array 110 according to the adjustment signal AS. Then, the capacitor array 110 can adjust the value of the capacitor array 110 according to turning-on and turning-off of the plurality of switches 11014-110N4 included by the capacitor array 110. Thus, the circuit 100 can change an equivalent capacitor generated by the antenna capacitor 1024 and the capacitor array 110 in parallel by adjusting the value of the capacitor array 110 to compensate for process variation of the inductor 1022 and the antenna capacitor 1024. That is to say, the circuit 100 can change the resonant frequency ω of the antenna 102 by adjusting the value of the capacitor array 110.

As shown in FIG. 1A, after calibration of the circuit 100, the antenna 102 can receive the electric wave transmitted by the reader according to a resonant frequency ω'. Then a charging capacitor 112 is used for generating a direct current voltage V1 according to the electric wave transmitted by the reader received by the antenna 102, where the direct current voltage V1 can increase a charging speed of a direct current voltage generation circuit 114.

Figure 2:
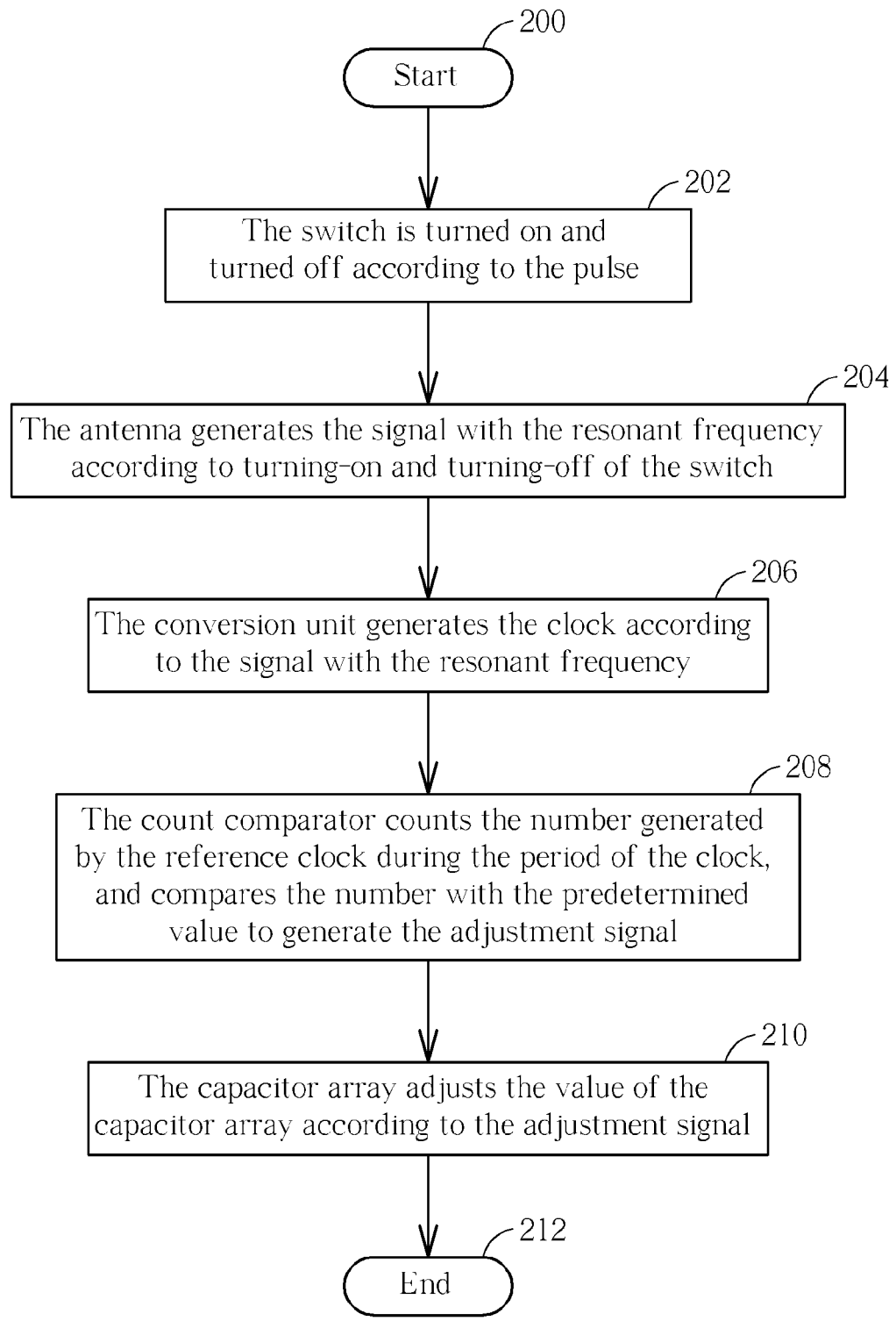
FIG. 2 is a flowchart illustrating a method capable of automatically calibrating a resonant frequency of an antenna according to another embodiment.

Please refer to FIG. 2. FIG. 2 is a flowchart illustrating a method capable of automatically calibrating a resonant frequency of an antenna according to another embodiment. The method in FIG. 2 uses the circuit 100 in FIG. 1A to illustrate the method. Detailed steps are as follows:

Step 200: Start.
Step 202: The switch 104 is turned on and turned off according to the pulse PS.
Step 204: The antenna 102 generates the signal S with the resonant frequency ω according to turning-on and turning-off of the switch 104.
Step 206: The conversion unit 106 generates the clock CL according to the signal S with the resonant frequency ω.
Step 208: The count comparator 108 counts the number CN generated by the reference clock REF during the period T of the clock CL, and compares the number CN with the predetermined value PV to generate the adjustment signal AS.
Step 210: The capacitor array 110 adjusts the value of the capacitor array 110 according to the adjustment signal AS.
Step 212: End.

In Step 204, the first terminal of the antenna 102 is coupled to the direct current voltage V2, and the antenna 102 generates the signal S with the resonant frequency ω according to turning-on and turning-off of the switch 104. In Step 208, the clock CL generated by the conversion unit 106 is the digital square wave. In Step 210, the capacitor array 110 can turn on and turn off the plurality of switches 11014-110N4 included by the capacitor array 110 according to the adjustment signal AS. Then, the capacitor array 110 can adjust the value of the capacitor array 110 according to the turning-on and turning-off of the plurality of switches 11014-110N4. Thus, the circuit 100 can change the equivalent capacitor generated by the antenna capacitor 1024 and the capacitor array 110 in parallel by adjusting the value of the capacitor array 110 to compensate for the process variation of the inductor 1022 and the antenna capacitor 1024. That is to say, the circuit 100 can change the resonant frequency ω of the antenna 102 by adjusting the value of the capacitor array 110.

To sum up, the circuit capable of automatically calibrating the resonant frequency of the antenna and method thereof utilize the capacitor array with an adjustable value to shunt the antenna capacitor for generating the equivalent capacitor. Thus, the present invention can change the resonant frequency of the antenna by adjusting the value of the capacitor array to compensate for the process variation of the inductor and the antenna capacitor.

Those skilled in the art will readily observe that numerous modifications and alterations of the device and method may be made while retaining the teachings of the invention.

What is claimed is:

1. A circuit capable of automatically calibrating a resonant frequency of an antenna, the circuit comprising:
   an antenna having a first terminal, and a second terminal for receiving an electric wave transmitted by a reader;
   a switch having a first terminal coupled to the second terminal of the antenna, a second terminal coupled to ground, and a third terminal for receiving a pulse;
   a conversion unit having a first terminal coupled to the second terminal of the antenna for receiving a signal with the resonant frequency of the antenna, and a second terminal for outputting a clock, wherein the conversion unit is used for generating the clock according to the signal, and the clock is a digital square wave;
   a count comparator having a first terminal coupled to the second terminal of the conversion unit, and a second terminal for outputting an adjustment signal, wherein the count comparator is used for counting a number generated by a reference clock during a period of the clock, and comparing the number with a predetermined value to generate the adjustment signal;
   a capacitor array for adjusting a value of the capacitor array according to the adjustment signal.

2. The circuit of claim 1, wherein the antenna comprises:
   an inductor having a first terminal coupled to the first terminal of the antenna, and a second terminal coupled to the second terminal of the antenna; and
   an antenna capacitor having a first terminal coupled to the first terminal of the antenna, and a second terminal coupled to the second terminal of the antenna, wherein the antenna capacitor is used for shunting the capacitor array to adjust the resonant frequency of the antenna.

3. The circuit of claim 1, wherein the capacitor array comprises:
   a plurality of capacitor units, each capacitor unit comprising:
   a capacitor having a first terminal coupled to the first terminal of the antenna, and a second terminal; and
   a switch having a first terminal coupled to the second terminal of the capacitor, a second terminal coupled to the second terminal of the antenna, and a third terminal coupled to a third terminal of the capacitor array for receiving the adjustment signal, wherein the switch is used for being turned-on and turned-off according to the adjustment signal.

4. The circuit of claim 3, wherein values of the plurality of capacitors included by the capacitor array are the same.

5. The circuit of claim 3, wherein values of the plurality of capacitors included by the capacitor array are different.

6. A method capable of automatically calibrating a resonant frequency of an antenna, the method comprising:
- a switch being turned on and turned off according to a pulse;
- an antenna generating a resonant frequency according to turning-on and turning-off of the switch;
- a conversion unit generating a clock according to a signal with the resonant frequency, wherein the clock is a digital square wave;
- a count comparator counting a number generated by a reference clock during a period of the clock, and comparing the number with a predetermined value to generate the adjustment signal; and
- a capacitor array adjusting a value of the capacitor array according to the adjustment signal.

7. The method of claim 6, wherein the capacitor array adjusting the value of the capacitor array according to the adjustment signal comprises:
- the capacitor array turning on and turning off a plurality of switches included by the capacitor array according to the adjustment signal; and
- adjusting the value of the capacitor array according to turning-on and turning-off of the plurality of switches included by the capacitor array.

* * * * *